US008526319B2

(12) United States Patent
Su et al.

(10) Patent No.: US 8,526,319 B2
(45) Date of Patent: Sep. 3, 2013

(54) REPORTING OF CHANNEL QUALITY INDICATORS FOR A NON-LINEAR DETECTOR

(75) Inventors: Yi Su, Santa Clara, CA (US); Jia Tang, Campbell, CA (US); Atul A. Salvekar, Emeryville, CA (US); Lei Xiao, Mountain View, CA (US); Gokhan Mergen, San Jose, CA (US); Jonathan Sidi, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 12/910,609

(22) Filed: Oct. 22, 2010

(65) Prior Publication Data

US 2012/0099446 A1    Apr. 26, 2012

(51) Int. Cl.
*H04L 12/26* (2006.01)

(52) U.S. Cl.
USPC ............ 370/252; 370/342; 370/344; 370/473

(58) Field of Classification Search
USPC ......... 370/206, 208, 252, 335, 437; 375/285, 375/298
See application file for complete search history.

(56) References Cited

U.S. PATENT DOCUMENTS

| | | | | |
|---|---|---|---|---|
| 7,843,802 | B2 * | 11/2010 | Yue et al. ................. | 370/206 |
| 2006/0276212 | A1 | 12/2006 | Sampath et al. | |
| 2008/0219376 | A1 * | 9/2008 | Qi et al. .................. | 375/285 |
| 2009/0109909 | A1 | 4/2009 | Onggosanusi et al. | |
| 2012/0176996 | A1 * | 7/2012 | Kim et al. ................. | 370/329 |

OTHER PUBLICATIONS

Zhang, Yan and Chen, Hsiao-Hwa, "Mobile WiMAX: Toward Broadband Wireless Metropolitan Area Networks", Chapter 5: MIMO Spectral Efficiency of the Mobile Wimax Downlink, pp. 87-127, Auerbach Publications, 2007.
"Definition of MIMO operation on HS-PDSCH, preferred precoding and CQI reporting procedures, modified CQI tables", 3GPP TSG-RAN WG1 Meeting #47, R1-063573, Riga, Latvia, Nov. 6-10, 2006.
"3rd Generation Partnership Project; Technical Specification Group Radio Access Network; Physical layer procedures (FDD)" (Release 8), 3GPP TS 25.214 version 8.6.0, May 2009.
3GPP document R1-063573, "Definition of MIMO operation on Hs-PDSCH, preferred precoding and CQI reporting procedures, modified CQI tables", Nov. 9, 2006.
3GPP TS 25.214 version 8.6.0, May 2009.
International Search Report and Written Opinion—PCT/US2011/057392—ISA/EPO—Feb. 13, 2012.

(Continued)

*Primary Examiner* — Yemane Mesfin
*Assistant Examiner* — Wanda Z Russell
(74) *Attorney, Agent, or Firm* — Kenyon S. Jenckes

(57) ABSTRACT

Techniques for determining channel quality indicators (CQIs) for a non-linear detector at a user equipment (UE) are described. In one design, the UE may determine at least one parameter (e.g., at least one threshold) based on at least one constellation constrained capacity function. Each threshold may correspond to a maximum number of information bits for one stream when a particular modulation order is used for another stream. The UE may determine CQIs for multiple streams for the non-linear detector based on the at least one parameter. The UE may also select a precoding matrix (e.g., jointly with the CQIs) based on the at least one parameter. The UE may report the selected precoding matrix and the CQIs for the multiple streams. The UE may thereafter receive a transmission of the multiple streams, which may be transmitted based on the selected precoding matrix and the CQIs.

25 Claims, 9 Drawing Sheets

(56) References Cited

OTHER PUBLICATIONS

Mehlfuhrer C., et al., "Joint throughput optimized CQI and precoding weight calculation for MIMO HSDPA", Singals, Systems and Computers, 2008, 42nd Asilomar Conference on, IEEE, Piscataway, NJ, USA, Oct. 26, 2008, pp. 1320-1325, XP031475508, ISBN: 978-1-4244-2940-0 Contribution Simulations and measurements.

\* cited by examiner

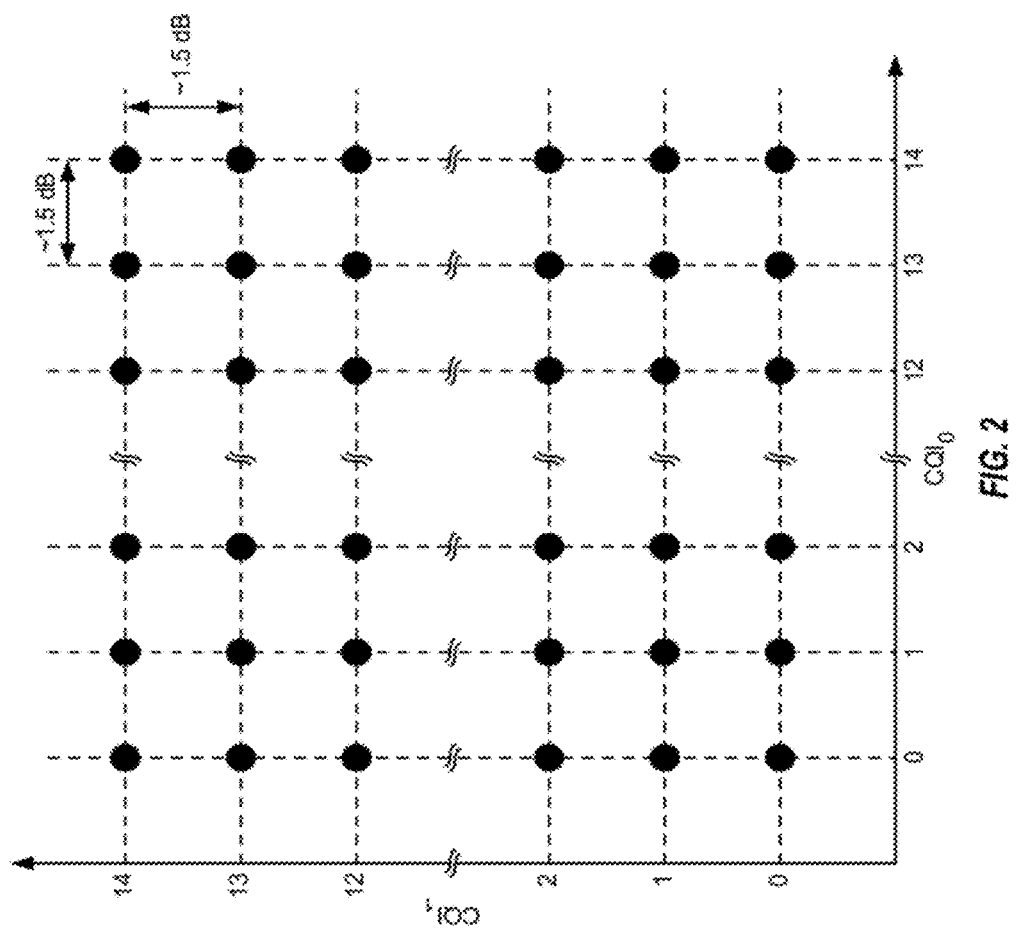

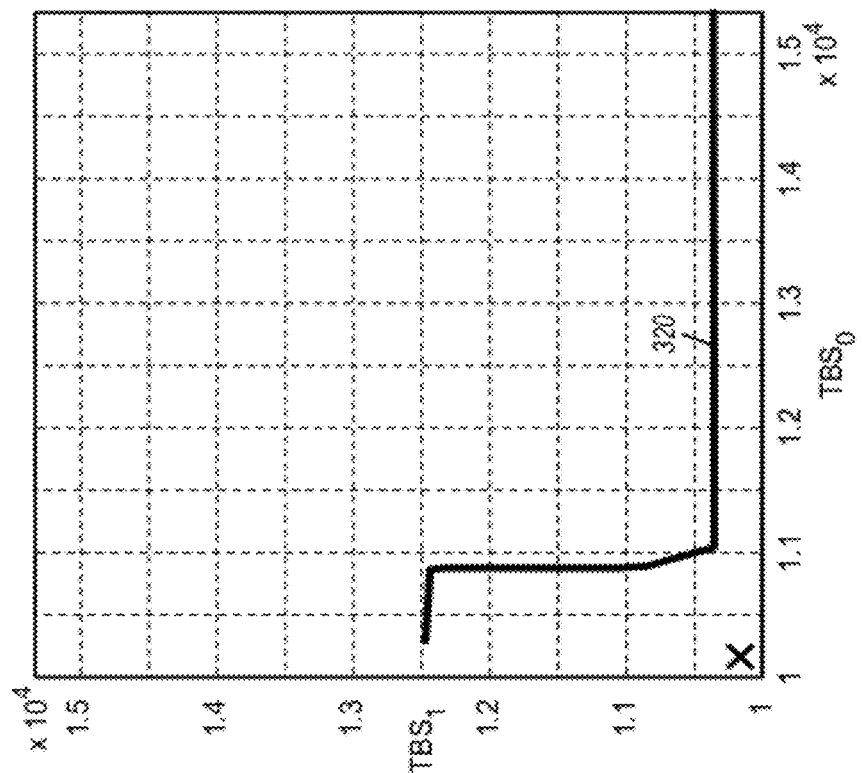
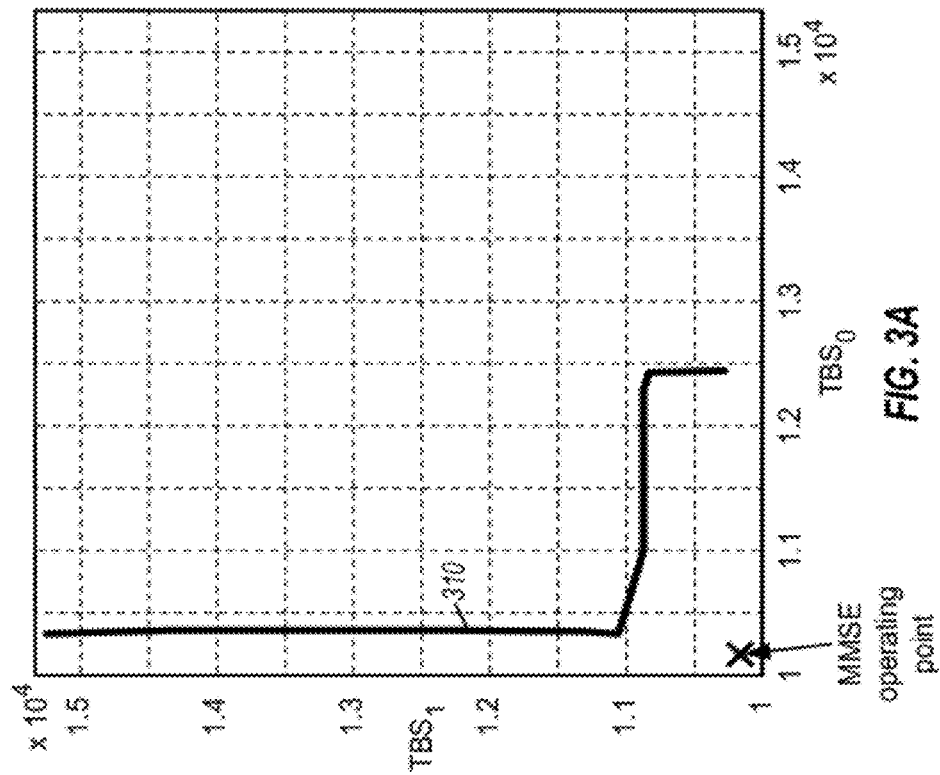

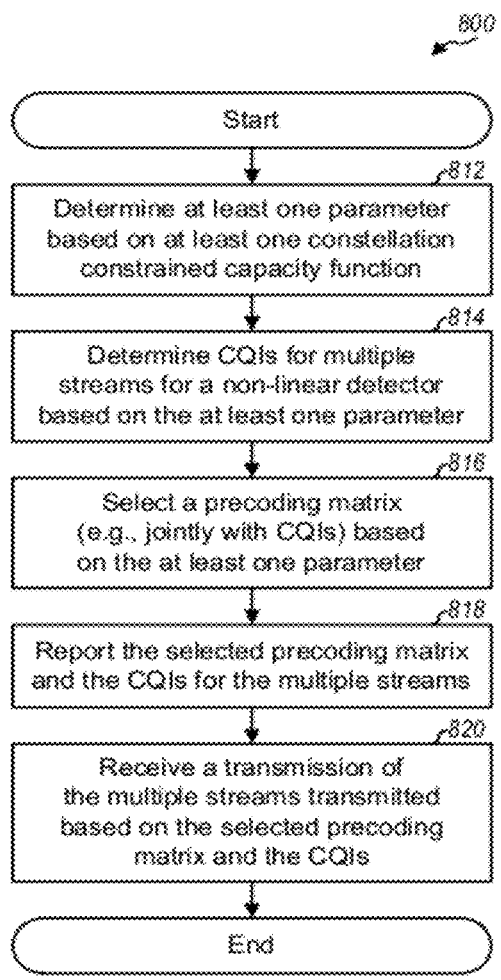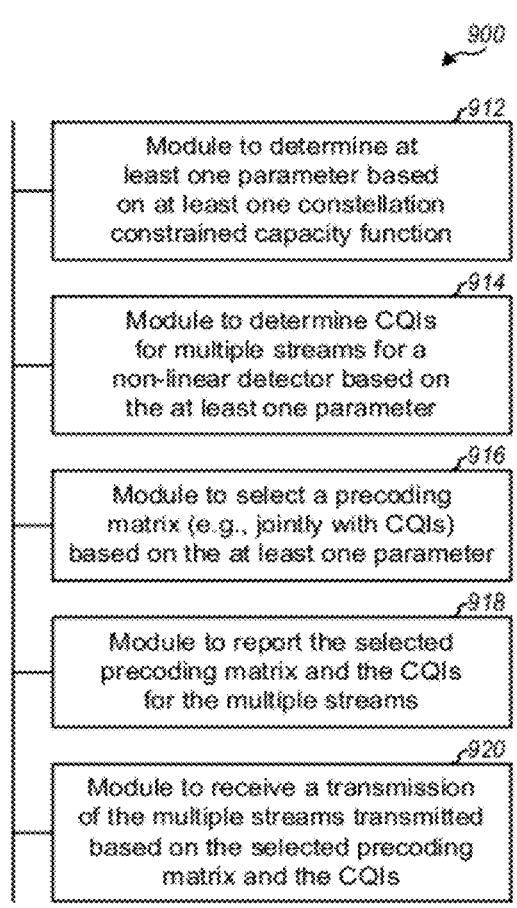

REPORTING OF CHANNEL QUALITY INDICATORS FOR A NON-LINEAR DETECTOR

BACKGROUND

I. Field

The present disclosure relates generally to communication, and more specifically to techniques for reporting channel quality indicators (CQIs) in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data via a wireless channel to a UE. Good performance may be achieved by having the UE estimate the received signal quality of the wireless channel, determine one or more CQIs for one or more data streams based on the received signal quality and the UE's processing capability, and report the CQI(s) to the base station. The base station may then transmit data based on the reported CQI(s). Data transmission performance may be dependent on the accuracy of the reported CQI(s). There is therefore a need in the art for techniques to efficiently and accurately determine CQI(s) in a wireless communication network.

SUMMARY

Techniques for determining CQIs for a non-linear detector at a UE (or some other entity) are described herein. A non-linear detector may be used to receive multiple data streams transmitted simultaneously via a multiple-input multiple-output (MIMO) channel and may have better performance than a linear detector. However, estimation of received signal quality for a non-linear detector may be much more complex than for a linear detector. Accurate and efficient determination of CQIs may enable the UE to obtain the better performance of the non-linear detector.

In one design, the UE may determine at least one parameter based on at least one constellation constrained capacity function. The UE may determine CQIs for multiple streams for a non-linear detector based on the at least one parameter. The UE may also select a precoding matrix (e.g., jointly with the CQIs) based on the at least one parameter. The UE may report the selected precoding matrix and the CQIs for the multiple streams. The UE may thereafter receive a transmission of the multiple streams, which may be transmitted based on the selected precoding matrix and the CQIs.

In one design, the multiple streams may comprise a first stream and a second stream. In one design, the UE may determine at least one first threshold for the first stream and at least one second threshold for the second stream based on the at least one constellation constrained capacity function. Each first threshold may be associated with a different modulation order and may correspond to a maximum number of information bits for the first stream when the associated modulation order is used for the second stream. Similarly, each second threshold may be associated with a different modulation order and may correspond to a maximum number of information bits for the second stream when the associated modulation order is used for the first stream. For example, the UE may determine (i) three first thresholds for the first stream for three modulation orders of QPSK, 16-QAM, and 64-QAM for the second stream and (ii) three second thresholds for the second stream for three modulation orders of QPSK, 16-QAM, and 64-QAM for the first stream. The first and second thresholds may relate to transport block size (TBS), or signal-to-noise-and-interference ratio (SINR), or some other parameter. The UE may determine the first and second thresholds based further on a precoding matrix, a channel matrix, and a noise covariance matrix, as described below. The UE may determine a pair of first and second thresholds associated with the highest overall throughput and may determine CQIs for the first and second streams based on this pair of first and second thresholds.

In one design, a base station may receive the CQIs and the precoding matrix from the UE. The base station may transmit the multiple streams to the UE based on the CQIs and the precoding matrix.

Various aspects and features of the disclosure are described in further detail below.

BRIEF DESCRIPTION OF THE DRAWINGS

FIG. 2 shows a diagram of two CQIs for two streams.
FIGS. 3A and 3B show plots of BLER contours for two streams.
FIG. 8 shows a process for reporting CQIs.
FIG. 9 shows an apparatus for reporting CQIs.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for a CDMA network, which may utilize WCDMA, cdma2000, or some other CDMA radio technology.

The techniques described herein may also be used for MIMO transmission on the downlink as well as the uplink. The techniques may be used to transmit S data streams simultaneously from multiple (T) transmit antennas to multiple (R) receive antennas, where in general $1 \leq S \leq \min \{T, R\}$. Each data stream may carry a packet in a transmission time interval (TTI) and may be referred to as a stream. A packet may also be referred to as a transport block, a codeword, etc. For clarity, certain aspects of the techniques are specifically described below for transmission of S=2 streams on the downlink from T=2 transmit antennas to R=2 receive antennas, which is supported by high-speed downlink packet access (HSDPA) in WCDMA. The techniques may be extended to cover any number of streams, any number of transmit antennas, and any number of receive antennas.

Figure 1A:
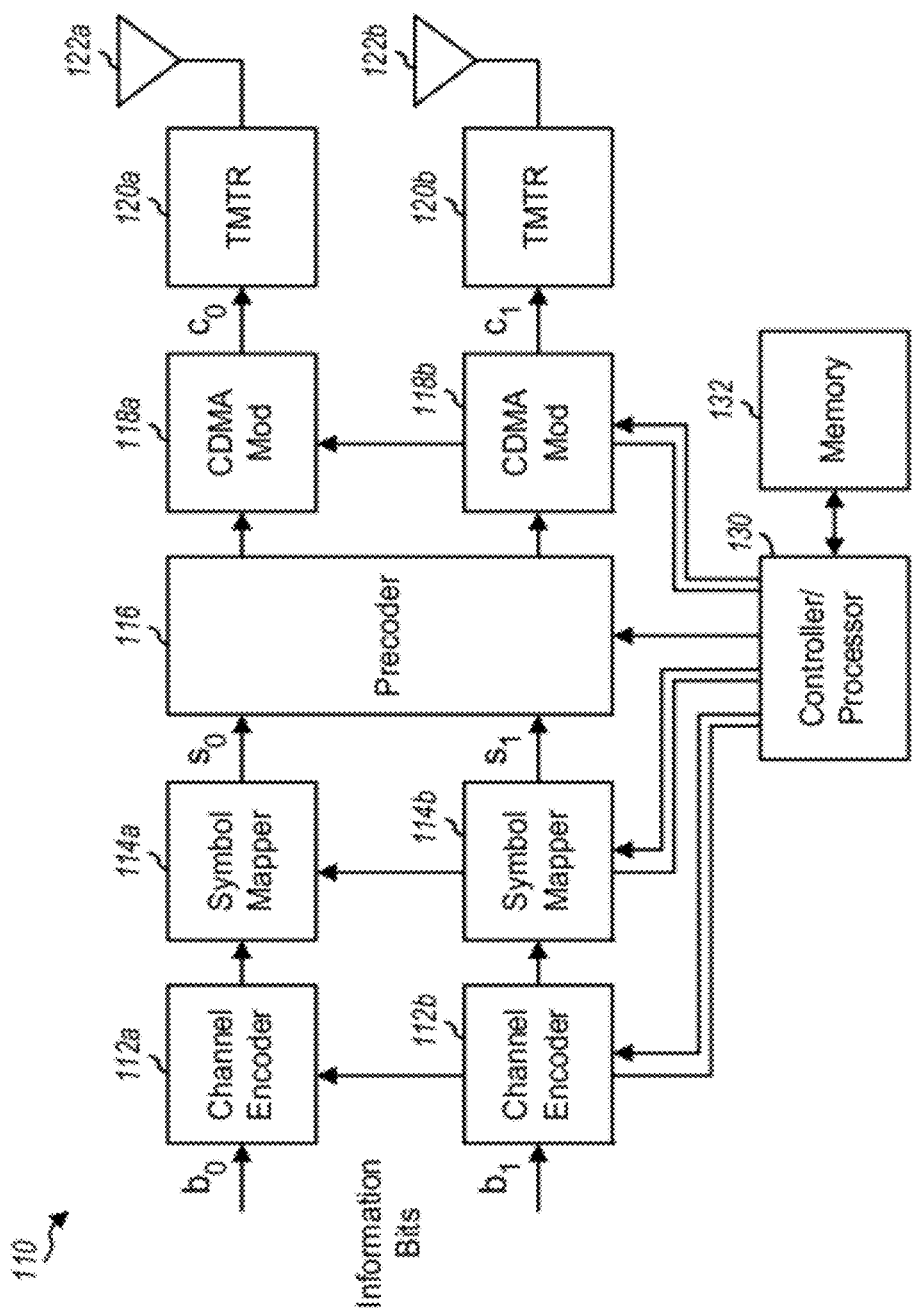
FIG. 1A shows a block diagram of a transmitter.

FIG. 1A shows a block diagram of a design of a transmitter 110 for a MIMO transmission. Transmitter 110 may be part of a base station for downlink transmission or part of a UE for uplink transmission. A base station may be an entity that communicates with the UEs and may also be referred to as a Node B, an evolved Node B (eNB), an access point, etc. A UE may be stationary or mobile and may also be referred to as a mobile station, a terminal, a station, a subscriber unit, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

At transmitter 110, a channel encoder 112a receives information bits $\{b_0\}$ for a first stream (stream 0), processes (e.g., encodes and interleaves) the information bits based on a coding scheme/code rate selected for the first stream, and provides code bits for the first stream. Similarly, a channel encoder 112b receives information bits $\{b_1\}$ for a second stream (stream 1), processes the information bits based on a coding scheme/code rate selected for the second stream, and provides code bits for the second stream. Each channel encoder 112 may implement a Turbo code, a convolutional code, a block code, etc. Each channel encoder 112 may also perform puncturing and/or repetition to obtain the desired number of code bits. A symbol mapper 114a maps the code bits for the first stream to modulation symbols $\{s_0\}$ based on a modulation order (e.g., QPSK, 16-QAM, or 64-QAM) selected for the first stream. A modulation order may also be referred to as a modulation scheme, a constellation, etc. A symbol mapper 114b maps the code bits for the second stream to modulation symbols $\{s_1\}$ based on a modulation order selected for the second stream.

A precoder 116 performs precoding on the modulation symbols for the first and second streams based on a precoding matrix and provides precoded symbols for two transmit antennas to CDMA modulators (Mod) 118a and 118b. CDMA modulators 118a and 118b process (e.g., spread and scramble) their precoded symbols and provide output chips $\{c_0\}$ and $\{c_1\}$, respectively. Each CDMA modulator 118 may segment its precoded symbols into K sub-blocks, where K is the number of orthogonal variable spreading factor (OVSF) codes allocated to a UE. Each CDMA modulator 118 may spread the precoded symbols in each sub-block with a different OVSF code, combine the spread samples for all K OVSF codes, and provide output samples. Transmitter units (TMTR) 120a and 120b process (e.g., convert to analog, amplify, filter, and frequency upconvert) the output samples from CDMA modulators 118a and 118b, respectively, and provide modulated signals, which are transmitted from antennas 122a and 122b, respectively.

Controller/processor 130 directs the operation of various processing units at transmitter 110. Memory 132 stores data and program codes for transmitter 110.

Figure 1B:
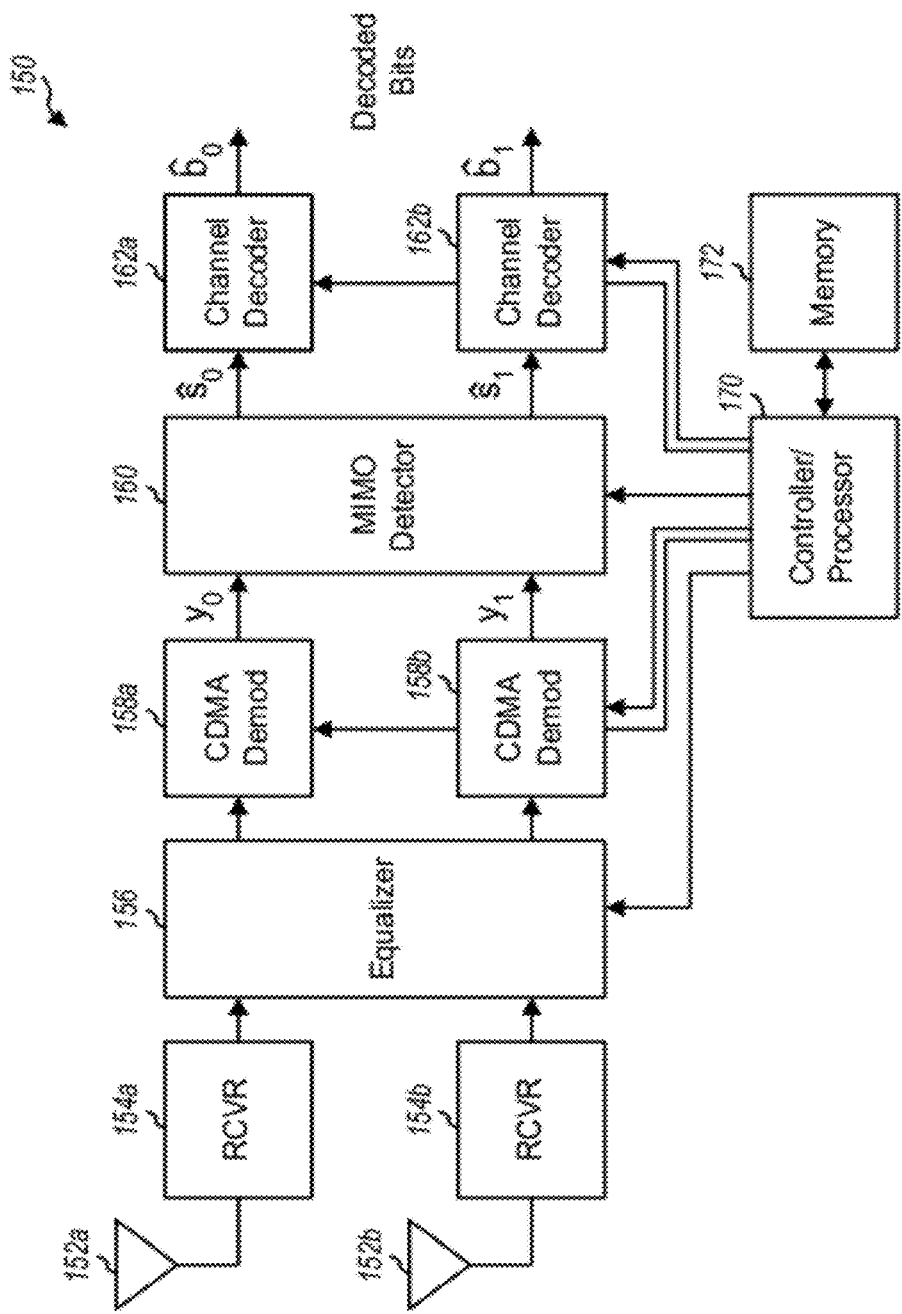
FIG. 1B shows a block diagram of a receiver.

FIG. 1B shows a block diagram of a design of a receiver 150 for a MIMO transmission. Receiver 150 may be part of a UE for downlink transmission or part of a base station for uplink transmission. At receiver 150, antennas 152a and 152b receive the modulated signals from transmitter 110 and provide received signals to receiver units (RCVR) 154a and 154b, respectively. Each receiver unit 154 processes (e.g., filters, amplifies, frequency downconverts, and digitizes) its received signal and provides input samples to an equalizer 156. Equalizer 156 performs filtering and equalization to account for multipath and provides equalized samples for the two receive antennas to CDMA demodulators (Demod) 158a through 158r. Each CDMA demodulator 158 processes (e.g., descrambles and despreads) its equalized samples and provides received symbols.

A MIMO detector 160 obtains the received symbols for both receive antennas, performs MIMO detection on the received symbols, and computes log-likelihood ratios (LLRs) for the code bits for the two streams. A channel decoder 162a receives and decodes the LLRs for the first stream and provides decoded data for the first stream. Similarly, a channel decoder 162b receives and decodes the LLRs for the second stream and provides decoded data for the second stream. In general, the processing by CDMA demodulators 158, MIMO detector 160, and channel decoders 162 at receiver 150 is complementary to the processing by CDMA modulators 118, precoder 116 and symbol mappers 114, and channel encoders 112 at transmitter 110.

Controller/processor 170 directs the operation of various processing units at receiver 150. Memory 172 stores data and program codes for receiver 150.

WCDMA supports a single stream (SS) mode and a dual stream (DS) mode. In the SS mode, a single stream may be precoded with a precoding vector and transmitted from two transmit antennas. In the DS mode, two streams may be precoded with a precoding matrix and transmitted from two transmit antennas.

To support data transmission on the downlink, a UE may report the following parameters:
1. Selection of the SS mode or the DS mode,
2. Selection of a precoding vector for the SS mode or a precoding matrix for the DS mode, and
3. Selection of CQI for each stream.

The UE may report precoding control information (PCI) indicative of the selected precoding vector or matrix, the SS/DS preference, and a CQI for each stream to a base station. The base station may determine a transport format resource combination (TFRC) for each stream based on the reported CQI for that stream and additional information such as the amount of data to send. The TFRC may be associated with a transport block size (TBS), a particular number of OVSF codes, and a particular modulation order to use for data transmission.

Table 1 shows an exemplary table of CQI versus TFRC for a case of 15 OVSF codes and a step size of approximately 1.5 decibels (dB) (in terms of SINR) between CQI values in WCDMA. As shown in Table 1, both TBS and modulation order are non-decreasing versus CQI. In the DS mode, one CQI is reported for each stream, each CQI has a value within a range of 0 to 14, and there are 225 possible combinations of $CQI_0$ for the first stream and $CQI_1$ for the second stream. Each CQI corresponds to a specific TBS size and a specific modulation order. In the SS mode, one CQI is reported for the single stream and has a value within a range of 0 to 31. The SS/DS preference and one or more CQIs for one or two streams are combined into a single 8-bit number that covers a total of 256 possibilities.

TABLE 1

| $CQI_1$ or $CQI_2$ | Transport Block Size (TBS) | Modulation Order |
|---|---|---|
| 0 | 4592 | QPSK |
| 1 | 4592 | QPSK |
| 2 | 5296 | QPSK |
| 3 | 7312 | QPSK |
| 4 | 9392 | QPSK |
| 5 | 11032 | QPSK |
| 6 | 14952 | 16-QAM |
| 7 | 17880 | 16-QAM |
| 8 | 21384 | 16-QAM |
| 9 | 24232 | 16-QAM |
| 10 | 27960 | 64-QAM |
| 11 | 32264 | 64-QAM |
| 12 | 36568 | 64-QAM |
| 13 | 39984 | 64-QAM |
| 14 | 42192 | 64-QAM |

FIG. 2 shows a pictorial representation of $CQI_0$ and $CQI_1$ for the DS mode. The horizontal axis represents $CQI_0$ for the first stream, and the vertical axis represents $CQI_1$ for the second stream. Each black dot represents a different combination of $CQI_0$ and $CQI_1$ for the two streams. For simplicity, only a subset of the 225 possible combinations of $CQI_0$ and $CQI_1$ are shown in FIG. 2. The black dots are separated by approximately 1.5 dB in each of the horizontal and vertical directions. One combination of $CQI_0$ and $CQI_1$ that maximizes the overall throughput for the two streams may be selected.

In the SS mode, the received symbols from CDMA demodulators 158 may be expressed as:

$$y = Hps + n, \quad \text{Eq (1)}$$

where s is a modulation symbol for the single stream, p is a precoding vector for the single stream, H is a channel matrix for the wireless channel from transmitter 110 to receiver 150, $y = [y_0 \ y_1]^T$ is a vector of received symbols from the two receive antennas, n is a vector of noise and interference observed by receiver 150, and "$T$" denotes a transpose.

The precoding vector p may be selected from a set of four possible precoding vectors $p_0$ through $p_3$, where $$p_m = \begin{bmatrix} 1/\sqrt{2} \\ w_m \end{bmatrix},$$

for m=0, ..., 3, with $w_0 = (1+j)/2$, $w_1 = -w_0$, $w_2 = (1-j)/2$, and $w_3 = -w_2$.

In the DS mode, the received symbols from CDMA demodulators 158 may be expressed as:

$$y = HPs + n, \quad \text{Eq (2)}$$

where $s = [s_0 \ s_j]^T$ is a vector of modulation symbols for the two streams, and P is a precoding matrix for the two streams.

The precoding matrix P may be selected from a set of four possible precoding matrices $P_0$ through $P_3$, where $$P_m = \frac{1}{\sqrt{2}} \begin{bmatrix} 1 & 0 \\ 0 & e^{j\theta_m} \end{bmatrix} \cdot \begin{bmatrix} 1 & 1 \\ 1 & -1 \end{bmatrix}, \ \theta_0 = \frac{\pi}{4}, \ \theta_1 = \frac{7\pi}{4},$$

and the remaining two precoding matrices may be obtained by swapping the columns of the first two precoding matrices. An equivalent channel matrix $H_{eq}$ may be defined as:

$$H_{eq} = HP. \quad \text{Eq (3)}$$

In general, one or more streams may be transmitted with precoding (e.g., as shown in equations (1) and (2)) or without precoding. If precoding is not performed in the DS mode, then the received symbols may be expressed as y=Hs+n, and the equivalent channel matrix may be expressed as $H_{eq}$=H. For clarity, much of the description below assumes the use of precoding.

The noise and interference have a covariance matrix of $R_{nn} = E\{n\ n^H\}$, where "$H$" denotes a conjugate transpose. The noise covariance matrix $R_{nn}$ and the channel matrix H may both be estimated based on a pilot channel transmitted by transmitter 110. The noise and interference may also be assumed to be additive white Gaussian noise (AWGN) with a variance of $\sigma_n^2$. In this case, the noise covariance matrix may be given as $R_{nn} = \sigma_n^2 I$, where I is an identity matrix.

MIMO detector 160 may compute LLRs for the code bits based on the received symbols y, the equivalent channel matrix $H_{eq}$, and the noise covariance matrix $R_{nn}$. In one design, MIMO detector 160 may compute the LLRs based on a max-log-map (MLM) algorithm, as follows:

$$L(b_k) = \log\left(\frac{Pr\{b_k = 0 \mid \bar{y}\}}{Pr\{b_k = 1 \mid \bar{y}\}}\right) \quad \text{Eq (4)}$$

$$= \log\left(\frac{\sum_{s:b_k=0} Pr\{\bar{y} \mid s\}}{\sum_{s:b_k=1} Pr\{\bar{y} \mid s\}}\right)$$

$$\approx \log\left(\frac{\max_{s:b_k=0} Pr\{\bar{y} \mid s\}}{\max_{s:b_k=1} Pr\{\bar{y} \mid s\}}\right)$$

$$= \min_{s:b_k=0} d^2(s) - \min_{s:b_k=1} d^2(s)$$

where $L(b_k)$ is the LLR of code bit $b_k$, $d(s) = \|\bar{y} - \bar{H}_{eq} s\|$, $\bar{y} = R_{nn}^{1/2} y$ is a vector of pre-whitened received symbols, and $\bar{H}_{eq} = R_{nn}^{1/2} H_{eq}$ is a channel matrix after noise whitening.

The MLM algorithm approximates the log-sum-exponent functions in the rightmost part of the first row of equation (4) with max-log-map functions. The MLM algorithm simplifies the computation of a maximum a-posteriori probability (MAP) algorithm by retaining only the dominant factor contributing to the a-posteriori probabilities that the code bit under consideration is 1 or 0. The MLM algorithm is a non-linear detector that can outperform linear detectors such as zero-forcing (ZF) and minimum mean square error (MMSE) detectors. The MLM algorithm may allow near-optimal detection of symbols transmitted via a MIMO channel.

The determination of $CQI_0$ and $CQI_1$ for the two streams in the DS mode may be formulated as follows. For a given channel matrix H and a given noise covariance matrix $R_{nn}$, a precoding matrix P as well as $CQI_0$ and $CQI_1$ may be selected to maximize the overall throughput for the two streams. The throughput maximization may be expressed as:

$$\max_{CQI_0, CQI_1} \sum_{i=0}^{1} TBS_{CQI_i} \cdot [1 - BLER_i(H_{eq}, R_{nn}, CQI_0, CQI_1)], \quad \text{Eq (5)}$$

where $TBS_{CQI_i}$ is the TBS corresponding to $CQI_i$ for stream i, with i=0, 1, and $BLER_i$ is a block error rate for stream i.

In equation (5), the summation provides the overall throughput for the two streams. The throughput of each stream may be determined based on the TBS and the BLER of that stream. The TBS of each stream may be determined by the CQI of that stream, e.g., as shown in Table 1. The BLER of each stream may be dependent on $H_{eq}$, $R_{nn}$, $CQI_0$ and $CQI_1$, as described below.

Algorithms to determine CQIs for MIMO transmission are typically designed for linear detectors such as ZF and MMSE detectors. For a linear detector, the SINR per symbol at the output of the linear detector may be computed. For example, the SINRs of the two streams in the DS mode from an MMSE detector may be expressed as:

$SINR_0 = h_{eq,0}^H (R_{nn} + h_{eq,1} h_{eq,1}^H)^{-1} h_{eq,0}$, and $\quad$ Eq (6)

$SINR_1 = h_{eq,1}^H (R_{nn} + h_{eq,0} h_{eq,0}^H)^{-1} h_{eq,1}$, $\quad$ Eq (7)

where $H_{eq} = [h_{eq,0} \ h_{eq,1}]$, $SINR_0$ is the SINR of stream 0, and $SINR_1$ is the SINR of stream 1. SINR of each stream may be mapped to a CQI based on a mapping table.

For a linear detector, different possible precoding vectors or matrices may be evaluated. For each precoding vector or matrix, the equivalent channel matrix $H_{eq}$ may be computed based on that precoding vector or matrix, the SINRs of the two streams may be computed based on the equivalent channel matrix and mapped to CQIs, and the overall throughput for the two streams may be computed based on the TBS values corresponding to the CQIs. The precoding vector or matrix and the CQIs with the highest overall throughput may be selected and reported.

For the MLM detector, different possible precoding vectors or matrices may be evaluated in similar manner as described above for a linear detector. However, it may be difficult to define the SINRs of the two streams due to the non-linear nature of the MLM detector. CQI algorithms designed for a linear detector may be used for the MLM detector but may not provide good performance. A good CQI algorithm for the MLM detector should take into account the nature of MLM detection and should reliably estimate its maximum achievable throughput by efficiently extracting sufficient information from $H_{eq}$, $R_{nn}$, $CQI_0$ and $CQI_1$.

As shown in equation (5), the maximum overall throughput for the MLM detector is dependent on the BLER of each stream. To solve equation (5), BLER contours for both streams may be generated for different TBS/CQI combinations under various realizations of $H_{eq}$ in an AWGN channel.

FIG. 3A shows an exemplary plot 310 of a 10% BLER contour for the first stream with 0.5 dB sample intervals for both $TBS_0$ for the first stream and $TBS_1$ for the second stream. FIG. 3B shows an exemplary plot 320 of a 10% BLER contour for the second stream with 0.5 dB sample intervals for both $TBS_0$ and $TBS_1$. In both FIGS. 3A and 3B, a cross mark at the bottom left corner of the graph represents an operating point determined by a CQI algorithm for an MMSE detector (or an MMSE-CQI algorithm). This operating point is defined by $TBS_0^{MMSE}$ and $TBS_1^{MMSE}$ selected for the two streams by the MMSE-CQI algorithm.

The following observations can be made from the BLER contours in FIGS. 3A and 3B. For the first observation, the BLER of the first stream is insensitive to the TBS/CQI of the second stream if the modulation order of the second stream is unchanged. If the modulation order of the second stream is changed, then the BLER of the first stream may change depending on $H_{eq}$ and $R_{nn}$. Similarly, the BLER of the second stream is affected by the modulation order for the first stream. This may imply that the BLER of stream i may be given as $BLER_i(H_{eq}, R_{nn}, CQI_i, Q_j)$, where j=1−i, and $Q_j$ denotes the modulation order of interfering stream j.

For the second observation, if the modulation order of the interfering stream j is fixed, then the BLER of stream i may be approximated as follows:

$BLER_i(H_{eq}, R_{nn}, CQI_i^*, Q_j) \approx 0$, $\quad$ Eq (8)

$BLER_i(H_{eq}, R_{nn}, CQI_i^*, Q_j) \approx 1$, $\quad$ Eq (9)

where $CQI_i^* = \max \{m | BLER_i(H_{eq}, R_{nn}, m, Q_j) \approx 0\}$. $CQI_i^*$ is the maximum CQI value such that stream i can be decoded correctly for the given $H_{eq}$, $R_{nn}$, and modulation order $Q_j$ for interfering stream j. Equations (8) and (9) exploit the relatively large spacing (of approximately 1.5 dB) between two adjacent TBS/CQI values in Table 1.

The second observation implies that the BLER of stream i may be approximated by a step function for an AWGN channel, with the BLER being equal to 0 below some TBS threshold and equal to 1 above the TBS threshold. This TBS threshold may be denoted as $TBS_i^Q$ and may correspond to the maximum number of information bits that can be reliably decoded per TTI for stream i when modulation order Q is used for the interfering stream.

For the third observation, the MLM detector has very low BLERs when operated at the operating point for the MMSE detector. For the MMSE detector, $TBS_0^{MMSE}$ and $TBS_1^{MMSE}$ may be determined for the two streams based on a look-up table that maps SINR to TBS based on an assumption of Gaussian noise. However, since the interfering stream imparts discrete interference, the MLM detector may exploit this information and possibly support a higher TBS than the operating point for the MMSE detector. Hence, $TBS_0^{MMSE}$ and $TBS_1^{MMSE}$ may be viewed as a reference point, and improvement in TBS may be possible due to more favorable discrete interference from modulation order $Q \in \{QPSK, 16QAM, 64QAM\}$ for the given $H_{eq}$ and $R_{nn}$.

Based on the above observations, $TBS_0$ and $TBS_1$ may be determined for the two streams for the MLM detector by first determining feasible BLER regions. For the given $H_{eq}$ and $R_{nn}$, six TBS thresholds $TBS_0^{QPSK}$, $TBS_0^{16QAM}$, $TBS_0^{64QAM}$, $TBS_1^{QPSK}$, $TBS_1^{16QAM}$, and $TBS_1^{64QAM}$ may be determined.

Figure 4A:
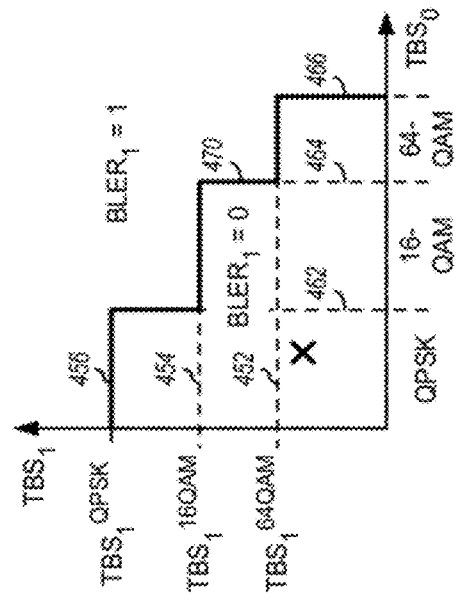
FIGS. 4A to 4C show plots of feasible BLER regions for two streams.

FIG. 4A shows a plot of a feasible BLER region for the first stream. The horizontal axis represents $TBS_0$ for the first stream, and the vertical axis represents $TBS_1$ for the second stream. Dashed lines 412, 414 and 416 correspond to $TBS_0^{64QAM}$, $TBS_0^{16QAM}$, and $TBS_0^{QPSK}$, respectively. A dashed line 422 corresponds to a TBS value at which the modulation order for the second stream switches from QPSK to 16-QAM. A dashed line 424 corresponds to a TBS value at which the modulation order switches from 16-QAM to 64-QAM. A line 426 corresponds to the maximum TBS value. A step-wise line 430 represents the TBS threshold for different modulation orders. The BLER of the first stream is approximately 1 above line 430 and is approximately 0 below line 430. The feasible BLER region for the first stream is below line 430.

Figure 4B:
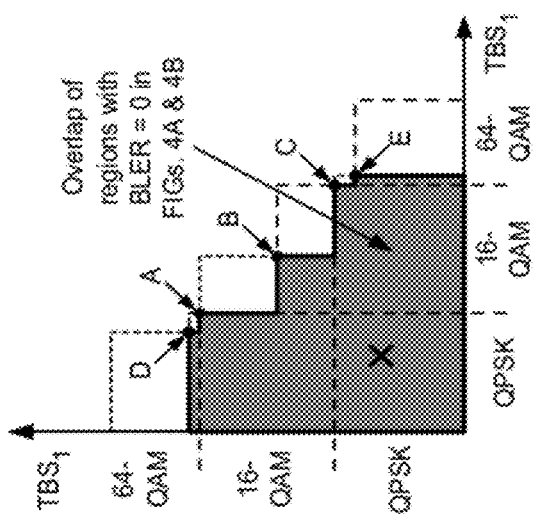

FIG. 4B shows a plot of a feasible BLER region for the second stream. Dashed lines 452, 454 and 456 correspond to $TBS_1^{64QAM}$, $TBS_1^{16QAM}$ and $TBS_1^{QPSK}$, respectively. Dashed lines 462 and 464 correspond to TBS values at which the modulation order for the first stream switches from QPSK to 16-QAM and from 16-QAM to 64-QAM. A line 466 corresponds to the maximum TBS value. A step-wise line 470 represents the TBS threshold for different modulation orders. The BLER of the second stream is approximately 1 above line 470 and is approximately 0 below line 470. The feasible BLER region for the second stream is below line 470.

As shown in FIGS. 4A and 4B, the TBS threshold for each stream decreases as the modulation order increases from QPSK to 16-QAM and 64-QAM. This means that progressively larger TBS can be supported for stream i for progressively lower modulation order on interfering stream j.

Figure 4C:
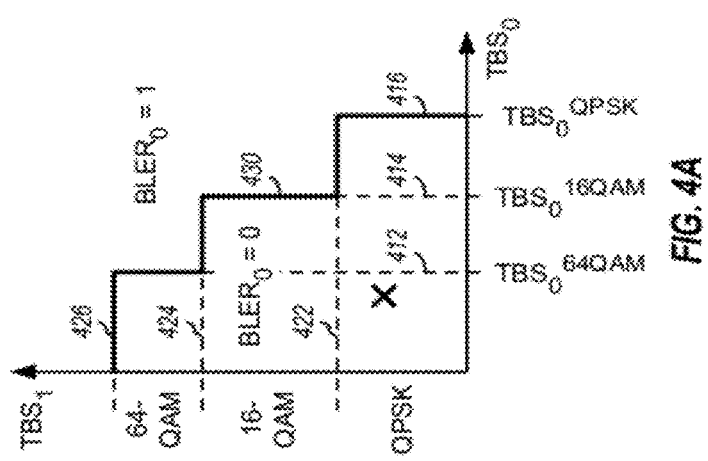

FIG. 4C shows a plot of an overall feasible BLER region formed by the intersection of the feasible BLER regions for the two streams in FIGS. 4A and 4B. The overall feasible BLER region is shown with shading in FIG. 4C and covers TBS values such that the BLER is approximately 0 for both streams. The highest overall throughput for both streams may be determined by (i) determining the overall throughput for the two streams based on $TBS_0$ and $TBS_1$ at each vertex (e.g., at points A, B, C, D and E) in FIG. 4C and (ii) selecting the combination of $TBS_0$ and $TBS_1$ with the largest overall throughput.

As shown in FIGS. 4A to 4C, the overall feasible BLER region is defined by the six TBS thresholds shown in FIGS. 4A and 4B. The TBS threshold for stream i with modulation order Q for interfering stream j may be determined for the given $H_{eq}$ and $R_{nn}$. The required SINR for different TBS values with a particular BLER (e.g., 10% BLER) for a Turbo decoder under Gaussian noise may be determined (e.g., via computer simulations or empirical analysis). The throughput achieved for stream 1 with Gaussian noise may be improved due to more favorable non-Gaussian noise resulting from discrete interference with modulation order Q used for stream j. This throughput improvement may be captured via the notion of constellation constrained capacity, which is capacity for a stream constrained by a particular modulation order (or constellation) used for the stream.

Equation (2) may be rewritten as follows:

$$y = h_{eq,0} s_0 + h_{eq,1} s_1 + n. \quad \text{Eq (10)}$$

As shown in equation (10), the two streams are transmitted via two single-input multiple-output (SIMO) channels having channel vectors of $h_{eq,0}$ and $h_{eq,1}$.

The capacity of the SIMO channel for stream i with discrete interference, which is also referred to as the mutual information, may be expressed as:

$$C(s_i, y) = C(s_j, y) - C(s_j, h_{eq,j} s_j + n) + \log_2(1 + h_{eq,i}^H R_{nn}^{-1} h_{eq,i}), \quad \text{Eq (11)}$$

where
$C(s_j, y)$ and $C(s_j, h_{eq,j} s_j + n)$ are constellation constrained capacities of SIMO channels for stream j with discrete input $s_j$ and Gaussian noise $h_{eq,i} s_i + n$ and n, respectively, and
$C(s_i, y)$ is the capacity of the SIMO channel for stream i with discrete interference.

The capacity of the SIMO channel for stream i in equation (11) assumes that modulation symbol $s_j$ of stream i and noise n are Gaussian and that modulation symbol $s_j$ of interfering stream j is generated with modulation order Q. The equivalent SINRs of the SIMO channels for stream j may be expressed as:

$$SINR_{1,j} = h_{eq,j}^H (R_{nn} + h_{eq,i} h_{eq,i}^H)^{-1} h_{eq,j}, \text{ and} \quad \text{Eq (12)}$$

$$SINR_{2,j} = h_{eq,j}^H R_{nn}^{-1} h_{eq,j}, \quad \text{Eq (13)}$$

where
$SINR_{1,j}$ is an equivalent SINR of the SIMO channel for $C(s_j, y)$, and
$SINR_{2,j}$ is an equivalent SINR of the SIMO channel for $C(s_j, h_{eq,j} s_j + n)$.

Three look-up tables for constellation constrained capacity for QPSK, 16-QAM, and 64-QAM in single-input single-output (SISO) channels may be defined. $SINR_{1,j}$ may be mapped to capacity $C_{1,j}^Q$ based on a look-up table for modulation order Q. $SINR_{2,j}$ may also be mapped to capacity $C_{2,j}^Q$ based on the look-up table for modulation order Q. The mapping of SINR to capacity may also be based on a suitable constellation constrained capacity function for modulation order Q. Equation (11) may then be rewritten as:

$$C(s_i, y, Q) = C_{1,j}^Q - C_{2,j}^Q + \log_2(1 + h_{eq,i}^H R_{nn}^{-1} h_{eq,i}), \quad \text{Eq (14)}$$

where $C(s_i, y, Q)$ is the capacity of the SIMO channel for stream i with modulation order Q used on interfering stream j.

As shown in equation (14), the capacity of the SIMO channel for stream i with discrete interference includes two parts. The first part includes $\Delta C_j^Q = C_{1,j}^Q - C_{2,j}^Q$ and may be viewed as throughput degradation due to discrete interference from stream j. A lower modulation order leads to higher degradation, so that $\Delta C_j^{QPSK} \geq \Delta C_j^{16QAM} \geq \Delta C_j^{64QAM}$. The second part includes $\log_2(1 + h_{eq,i}^H R_{nn}^{-1} h_{eq,i})$ and is a SIMO channel capacity without interference from interfering stream j.

The capacity $C(s_i, y)$ of stream i with discrete interference may be mapped to SINR based on an unconstrained capacity function, as follows:

$$SINR_i^Q = 2^{C(s_i, y, Q)} - 1, \quad \text{Eq (15)}$$

where $SINR_i^Q$ is the SINR of stream i with modulation order Q being used on interfering stream j.

In one design, $SINR_i^Q$ may be mapped to a TBS threshold $TBS_i^Q$ for stream i with modulation order Q for interfering stream j based on a SINR-to-TBS mapping table. This SINR-to-TBS mapping table may be obtained empirically for different channel codes with a particular target BLER. In general, $C(s_i, y, Q)$ increases as the modulation order of the interfering stream j decreases. This leads to $TBS_i^{QPSK} \geq TBS_i^{16QAM} \geq TBS_i^{64QAM} \geq TBS_i^{MMSE}$. A larger TBS may be requested for stream i by reducing the modulation order of interfering stream j, which is reflected in FIGS. 4A to 4C.

In another design, SINR may be mapped to TBS based on a function, which may be as follows:

$$TBS = 480 \cdot N_C \cdot \log_2\left(1 + \frac{SINR^{0.8933}}{1.2871}\right), \quad \text{Eq (16)}$$

where $N_C$ is the number of OVSF codes. Equation (16) shows an exemplary function for mapping from SINR to TBS. Other functions may also be used to map SINR to TBS.

Figure 5:
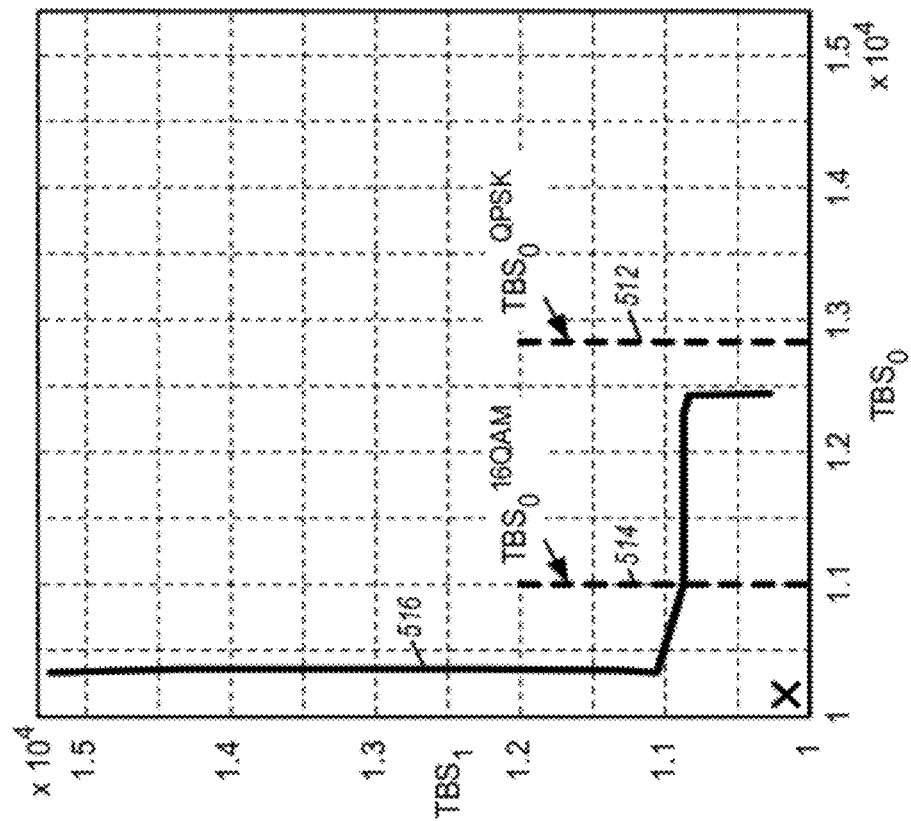
FIG. 5 shows plots of TBS thresholds for one stream.

FIG. 5 shows plots of the TBS thresholds for stream 0. A vertical line 512 represents TBS threshold $TBS_0^{QPSK}$ for stream 0 with QPSK being used for stream 1. A vertical line 514 represents TBS threshold $TBS_0^{16QAM}$ for stream 0 with 16-QAM being used for stream 1. A line 516 represents a TBS threshold that results in the target BLER based on computer simulations. As shown in FIG. 5, the TBS thresholds $TBS_0^{QPSK}$ and $TBS_0^{16QAM}$ estimated based on the computation in equations (11) to (14) may be optimistic. Hence, some TBS margins may be applied in order to obtain the target BLER.

In one design, $TBS_i^Q$ may be mapped to CQI based on a look-up table such as Table 1. The mapping of TBS to CQI may change due to various factors such as UE category, the number of OVSF codes, network operator, etc. Furthermore, information about modulation switching points on a TBS mapping table may not be available.

In another design, $SINR_i^Q$ may be mapped to CQI based on a look-up table. Operating in the SINR domain may improve performance since SINR may be largely insensitive with respect to the issues listed above for the TBS domain, especially in a well-designed system. Computer simulations show that the modulation switching points in the SINR domain are insensitive to the number of OVSF codes. For example, modulation switching points in the SINR domain versus $N_C$ may be as shown in Table 2. Furthermore, operating in the SINR domain may be more robust when information about modulation switching points on a TBS table is not available.

TABLE 2

| Number of OVSF Codes | QPSK → 16-QAM | 16-QAM → 64-QAM |
|---|---|---|
| $N_C = 1$ | SINR = 5 dB | SINR = 12.6 dB |
| $N_C = 15$ | SINR = 5.5 dB | SINR = 13 dB |

Figure 6:
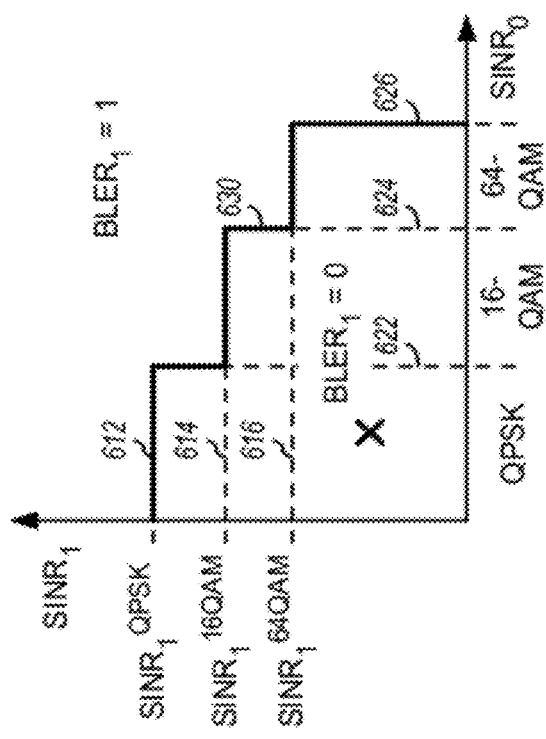
FIG. 6 shows a plot of a feasible BLER region for one stream based on SINR.

FIG. 6 shows a plot of a feasible BLER region for stream 1 based on SINR. The horizontal axis represents $SINR_0$ for stream 0, and the vertical axis represents $SINR_1$ for stream 1. Dashed lines 612, 614 and 616 correspond to three SINR thresholds $SINR_1^{QPSK}$, $SINR_1^{16QAM}$, and $SINR_1^{64QAM}$ respectively, for stream 1. A dashed line 622 corresponds to an SINR value at which the modulation order for stream 0 switches from QPSK to 16-QAM. A dashed line 624 corresponds to a SINR value at which the modulation order switches from 16-QAM to 64-QAM. A line 626 corresponds to the SINR value for the largest CQI value. A step-wise line 630 represents the SINR threshold for different modulation orders. The BLER of stream 1 is approximately 1 above line 630 and is approximately 0 below line 630. The feasible BLER region for stream 1 is below line 630.

The MLM-CQI algorithm described above may be used to determine CQIs with or without successive interference cancellation (SIC). For SIC, a receiver/UE may decode one stream at a time, typically starting with the stream having the best SINR or lowest BLER. If this stream is decoded correctly, then the interference due to the stream may be estimated (e.g., as $h_{eq,0} s_0$) and canceled from the received signals to obtain interference-canceled signals (e.g., $y - h_{eq,0} s_0$). The interference-canceled signals (instead of the received signals) may then be processed to recover another stream. SIC may enlarge the feasible BLER region of the stream recovered later and may push out the vertices. The BLER region for the stream recovered later with SIC may be predicted based on the BLER regions for the two streams without SIC.

Figure 7:
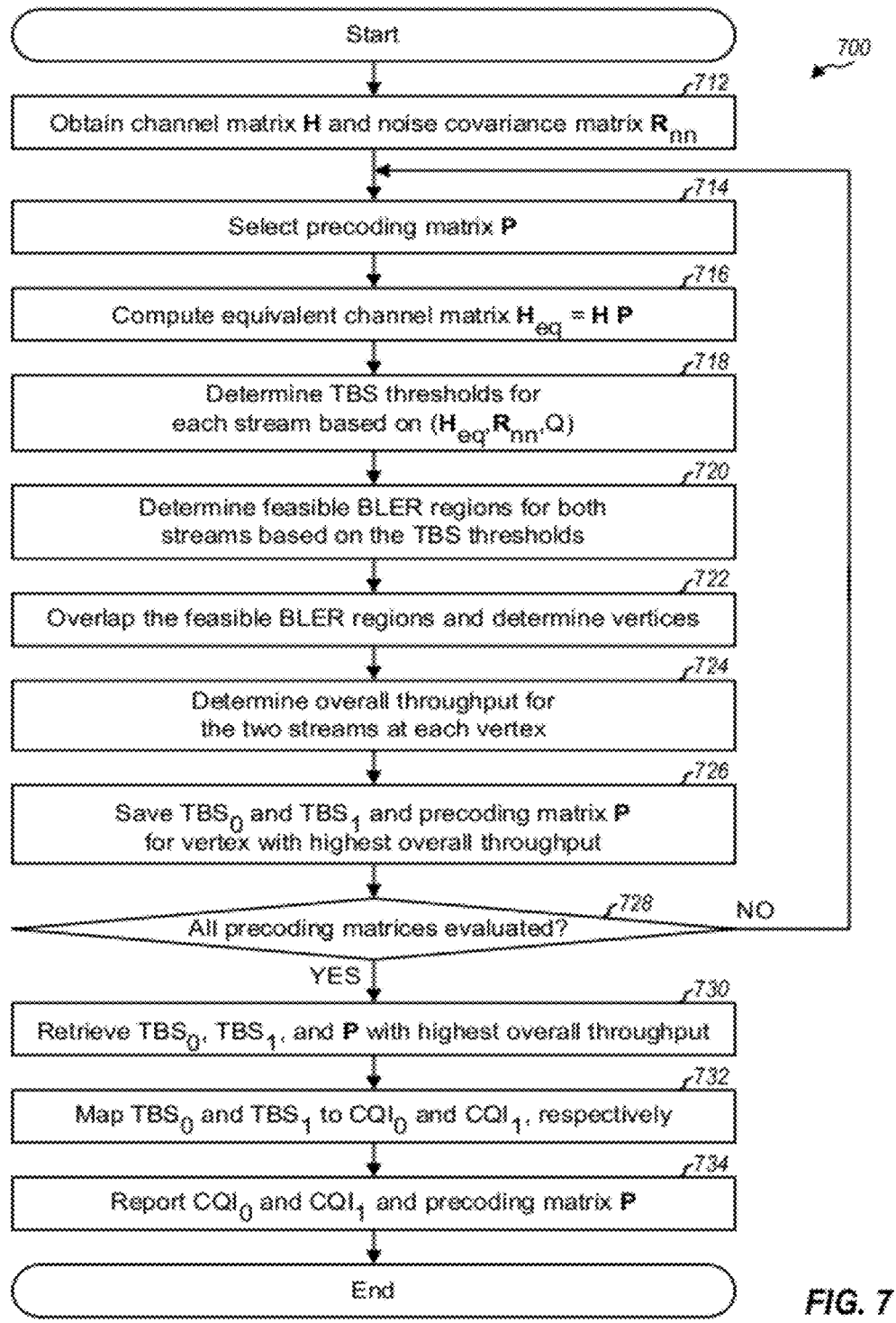
FIG. 7 shows a process for determining CQIs for two streams.

FIG. 7 shows a design of a process 700 for determining CQIs for two streams in the DS mode. Initially, a channel matrix H and a noise covariance matrix $R_{nn}$ may be obtained (block 712). A precoding matrix P may be selected for evaluation (block 714). An equivalent channel matrix $H_{eq}$ may be computed based on the channel matrix H and the precoding matrix P, e.g., as shown in equation (3) (block 716).

TBS thresholds for each stream may be determined based on the equivalent channel matrix $H_{eq}$, the noise covariance matrix $R_{nn}$, and the modulation order Q of the interfering stream, e.g., as described above (block 718). Feasible BLER regions for both streams may be determined based on the TBS thresholds for these streams, e.g., as shown in FIGS. 4A and 4B (block 720). The feasible BLER regions for the two streams may be overlapped, and the vertices may be determined, e.g., as shown in FIG. 4C (block 722). The overall throughput of the two streams may be determined at each vertex (block 724). In one design, the TBS thresholds for a vertex may first be quantized to the closest TBS values in Table 1, and the overall throughput for the vertex may be determined based on the quantized $TBS_0$ and $TBS_1$ for the two streams. The vertex with the highest overall throughput may be identified, and the corresponding TBS thresholds $TBS_0^Q$ and $TBS_1^Q$ for this vertex may be saved (block 726).

A determination is made whether all precoding matrices have been evaluated (block 728). If the answer is 'No', then the process returns to block 714 to select another precoding matrix for evaluation. Otherwise, if all precoding matrices have been evaluated, then the precoding matrix P with the highest overall throughput and the corresponding $TBS_0$ and $TBS_1$ for the two streams may be retrieved (block 730). $TBS_0$ and $TBS_1$ may be mapped to $CQI_0$ and $CQI_1$, respectively, for the two streams (block 732). The precoding matrix P and $CQI_0$ and $CQI_1$ for the two streams may be reported (block 734).

As noted above, the SS mode and the DS mode may be supported. In this case, the throughput of one stream may be computed for each of the available precoding vectors. The highest throughput for one stream in the SS mode may be compared against the highest overall throughput for two streams in the DS mode. If the highest throughput for one stream is higher than the highest overall throughput for two streams, then the SS mode may be selected, and the corresponding precoding vector and CQI for the one stream with the highest throughput may be reported. Otherwise, the DS mode may be selected, and the corresponding precoding matrix and $CQI_0$ and $CQI_1$ for the two streams with the highest overall throughput may be reported.

For a brute-force method, all 225 possible combinations of $CQI_0$ and $CQI_1$ may be evaluated for each possible precoding matrix. For each CQI combination, $BLER_0$ and $BLER_1$ may be computed based on the channel matrix H, the precoding matrix P, the noise covariance matrix $R_{nn}$, and $CQI_0$ and $CQI_1$ for that combination. The overall throughput for each CQI combination may then be computed based on $TBS_0$ and $TBS_1$ corresponding to $CQI_0$ and $CQI_1$ as well as $BLER_0$ and $BLER_1$, e.g., as shown in equation (5). The process may be repeated for each possible precoding matrix. The precoding matrix and $CQI_0$ and $CQI_1$ with the highest overall throughput may be selected. Computation may be extensive due to the many (e.g., 225) CQI combinations to evaluate for each precoding matrix.

The design shown in FIG. 7 may greatly reduce computation over the brute-force method. In particular, the TBS thresholds may be computed for only certain CQI values (e.g., CQI values 0, 6 and 10 in Table 1) corresponding to a change in modulation order. Furthermore, the BLER function may be approximated with a step function. This may greatly simplify the determination of $CQI_0$ and $CQI_1$ for the two streams for the MLM detector.

For clarity, the techniques for determining CQIs for two streams have been described for a MLM detector. The techniques may also be used for other non-linear detectors such as a maximum likelihood (ML) detector, a MLM detector with SIC (or MLM-SIC detector), a ML detector with SIC (or ML-SIC detector), a sphere detector, etc.

FIG. 8 shows a design of a process 800 for reporting CQIs. Process 800 may be performed by a UE (as described below) or by some other entity. The UE may determine at least one parameter based on at least one constellation constrained capacity function (block 812). The UE may determine CQIs for multiple streams for a non-linear detector based on the at least one parameter (block 814). The non-linear detector may comprise a MLM detector, or a ML detector, or a MLM-SIC detector, or a ML-SIC detector, or a sphere detector, or some other non-linear detector having better performance than a linear detector such as a MMSE detector or a ZF detector. The UE may also select a precoding matrix (e.g., jointly with the CQIs) based on the at least one parameter (block 816). The UE may report the selected precoding matrix and the CQIs for the multiple streams (block 818). The UE may thereafter receive a transmission of the multiple streams, which may be transmitted based on the selected precoding matrix and the CQIs (block 820).

In one design, the multiple streams may comprise a first stream and a second stream. In one design of block 812, the UE may determine at least one first threshold for the first stream and at least one second threshold for the second stream based on the at least one constellation constrained capacity function. Each first threshold may be associated with a different modulation order and may correspond to a maximum number of information bits for the first stream when the associated modulation order is used for the second stream. Similarly, each second threshold may be associated with a different modulation order and may correspond to a maximum number of information bits for the second stream when the associated modulation order is used for the first stream. The first and second thresholds may relate to TBS (e.g., as shown in FIGS. 4A to 4C), or SINR (e.g., as shown in FIG. 6), or some other parameter. In one design, the UE may determine the first and second thresholds based further on a precoding matrix, a channel matrix, and a noise covariance matrix, as described above. The first and second thresholds may be determined based further on SIC being performed for the multiple streams.

In one design, the UE may determine a first constellation constrained capacity (e.g., $C_{1,j}^Q$) of the SIMO channel for the second stream j with a particular modulation order Q being used for the second stream, Gaussian noise due to the first stream, and Gaussian channel noise, e.g., based on equation (12) and an SINR to capacity look-up table for modulation order Q. The UE may determine a second constellation constrained capacity (e.g., $C_{2,j}^Q$) of the SIMO channel for the second stream with the particular modulation order being used for the second stream and Gaussian channel noise, e.g., based on equation (13) and the SINR to capacity look-up table for modulation order Q. The UE may determine a first capacity of the SIMO channel for the first stream i with Gaussian channel noise, e.g., $\log_2(1+h_{eq,i}^H R_{nn}^{-1} h_{eq,i})$. The UE may determine a second capacity (e.g., $C(s_i,y,Q)$) of the SIMO channel for the first stream with discrete interference from the second stream based on the first and second constellation constrained capacities and the first capacity, e.g., as shown in equation (14). The UE may determine a first threshold for the first stream with the particular modulation order Q being used for the second stream based on the second capacity.

In one design, the UE may determine a plurality of vertices of a graph formed based on the at least one first threshold on a horizontal axis and the at least one second threshold on a vertical axis (e.g., as shown in FIG. 4C). The UE may determine an overall throughput for the first and second streams at each of the plurality of vertices. The UE may determine a vertex associated with the highest overall throughput among the plurality of vertices. The UE may then determine CQIs for the first and second streams based on a first threshold and a second threshold corresponding to the vertex associated with the highest overall throughput.

In one design, the UE may evaluate different precoding matrices that can be used for the first and second streams. The UE may repeat the determining a plurality of vertices, the determining an overall throughput, and the determining a vertex associated with the highest overall throughput for each of a plurality of precoding matrices. The UE may select a precoding matrix associated with the highest overall throughput among the plurality of precoding matrices. The UE may determine the CQIs for the first and second streams based on the first and second thresholds corresponding to the vertex associated with the highest overall throughput for the selected precoding matrix. In one design, the UE may map the first threshold to a first CQI for the first stream and may map the second threshold to a second CQI for the second stream.

In one design, the UE may select a single stream or multiple streams for transmission. The UE may determine throughput for a single stream for each of a plurality of precoding vectors. The UE may also determine the overall throughput for multiple (e.g., two) streams for each of a plurality of precoding matrices. The UE may select transmission of the single stream if the highest throughput for the single stream is higher than the highest overall throughput for the multiple streams. Alternatively, the UE may select transmission of the multiple streams if the highest overall throughput for the multiple streams is higher than the highest throughput for the single stream.

FIG. 9 shows a design of an apparatus 900 for reporting CQIs. Apparatus 900 includes a module 912 to determine at least one parameter based on at least one constellation constrained capacity function, a module 914 to determine CQIs for multiple streams for a non-linear detector based on the at least one parameter, a module 916 to select a precoding matrix (e.g., jointly with CQIs) based on the at least one parameter, a module 918 to report the selected precoding matrix and the CQIs for the multiple streams, and a module 920 to receive a transmission of the multiple streams transmitted based on the selected precoding matrix and the CQIs.

Figure 10:
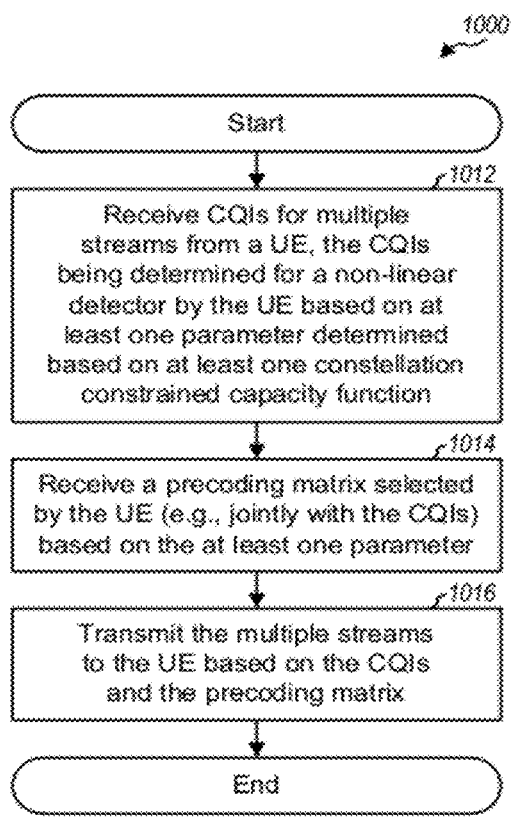
FIG. 10 shows a process for receiving CQIs.

FIG. 10 shows a design of a process 1000 for receiving CQIs. Process 1000 may be performed by a base station (as described below) or by some other entity. The base station may receive CQIs for multiple (e.g., two) streams from a UE (block 1012). The CQIs may be determined for a non-linear detector by the UE based on at least one parameter, which may be determined based on at least one constellation constrained capacity function. The base station may also receive a precoding matrix selected by the UE (e.g., jointly with the CQIs) based on the at least one parameter (block 1014). The base station may transmit the multiple streams to the UE based on the CQIs and the precoding matrix (block 1016).

Figure 11:
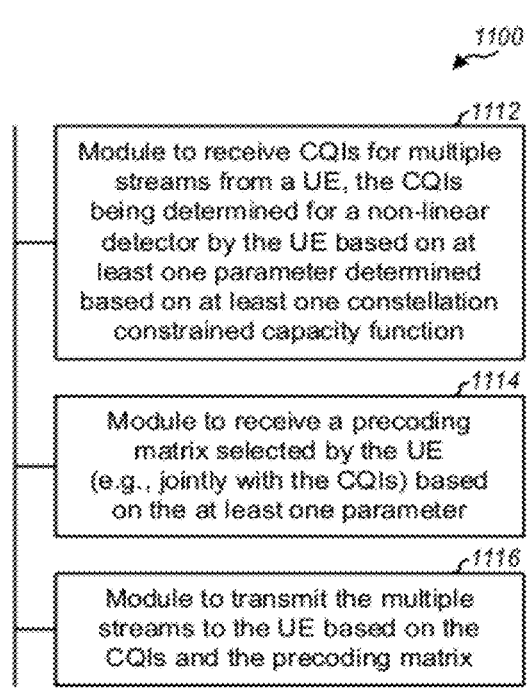
FIG. 11 shows an apparatus for receiving CQIs.

FIG. 11 shows a design of an apparatus 1100 for receiving CQIs. Apparatus 1100 includes a module 1112 to receive CQIs for multiple streams from a UE, with the CQIs being determined for a non-linear detector by the UE based on at least one parameter determined based on at least one constellation constrained capacity function, a module 1114 to receive a precoding matrix selected by the UE (e.g., jointly with the CQIs) based on the at least one parameter, and a module 1116 to transmit the multiple streams to the UE based on the CQIs and the precoding matrix.

The modules in FIGS. 9 and 11 may comprise processors, electronic devices, hardware devices, electronic components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
 determining at least one parameter based on at least one constellation constrained capacity function; and
 determining channel quantity indicators (CQIs) for multiple streams for a non-linear detector based on the at least one parameter,
 wherein the multiple streams comprise a first stream and a second stream,
 wherein the determining the at least one parameter comprises determining at least one first threshold for the first stream and at least one second threshold for the second stream based on the at least one constellation constrained capacity function, each first threshold corresponding to a different modulation order for the second stream, and each second threshold corresponding to a different modulation order for the first stream,
 wherein the determining the at least one first threshold and the at least one second threshold comprises determining the at least one first threshold and the at least one second threshold based further on a precoding matrix and a channel matrix, and wherein the determining the CQIs for the multiple streams comprises evaluating each of a plurality of precoding matrices, selecting a precoding matrix associated with a highest overall throughput among the plurality of precoding matrices, and determining CQIs for the first and second streams based on a first threshold and a second threshold corresponding to the highest overall throughput for the selected precoding matrix.

2. The method of claim 1, wherein the at least one first threshold and the at least one second threshold relate to transport block size (TBS).

3. The method of claim 1, wherein the at least one first threshold and the at least one second threshold relate to signal-to-noise-and-interference ratio (SINR).

4. The method of claim 1, wherein the determining the at least one first threshold and the at least one second threshold comprises determining the at least one first threshold and the at least one second threshold based further on a noise covariance matrix.

5. The method of claim 1, further comprising:
determining throughput for a single stream for each of a plurality of precoding vectors;
determining overall throughput for the multiple streams for each of a plurality of precoding matrices;
selecting transmission of the single stream if a highest throughput for the single stream is higher than a highest overall throughput for the multiple streams; and
selecting transmission of the multiple streams if the highest overall throughput for the multiple streams is higher than the highest throughput for the single stream.

6. The method of claim 1, wherein the non-linear detector comprises a max-log-map (MLM) detector, or a maximum likelihood (ML) detector, or a MLM detector with successive interference cancellation (SIC), or a ML detector with SIC, or a sphere detector.

7. The method of claim 1, wherein the at least one first parameter is determined based further on successive interference cancellation (SIC) being performed for the multiple streams.

8. A method for wireless communication, comprising:
determining at least one parameter based on at least one constellation constrained capacity function; and
determining channel quantity indicators (CQIs) for multiple streams for a non-linear detector based on the at least one parameter,
wherein the multiple streams comprise a first stream and a second stream,
wherein the determining the at least one parameter comprises determining at least one first threshold for the first stream and at least one second threshold for the second stream based on the at least one constellation constrained capacity function, each first threshold corresponding to a different modulation order for the second stream, and each second threshold corresponding to a different modulation order for the first stream,
wherein the determining the at least one first threshold and the at least one second threshold comprises
determining a first constellation constrained capacity of a channel for the second stream with a particular modulation order being used for the second stream, Gaussian noise due to the first stream, and Gaussian channel noise,
determining a second constellation constrained capacity of the channel for the second stream with the particular modulation order being used for the second stream and Gaussian channel noise,
determining a first capacity of a channel for the first stream with Gaussian channel noise,
determining a second capacity of the channel for the first stream with discrete interference from the second stream based on the first and second constellation constrained capacities and the first capacity, and
determining a first threshold for the first stream with the particular modulation order being used for the second stream based on the second capacity.

9. A method for wireless communication, comprising:
determining at least one parameter based on at least one constellation constrained capacity function; and
determining channel quantity indicators (CQIs) for multiple streams for a non-linear detector based on the at least one parameter,
wherein the multiple streams comprise a first stream and a second stream,
wherein the determining the at least one parameter comprises determining at least one first threshold for the first stream and at least one second threshold for the second stream based on the at least one constellation constrained capacity function, each first threshold corresponding to a different modulation order for the second stream, and each second threshold corresponding to a different modulation order for the first stream,
wherein the determining the CQIs for the multiple streams comprises
determining a plurality of vertices of a graph formed based on the at least one first threshold on a horizontal axis and the at least one second threshold on a vertical axis,
determining an overall throughput for the first and second streams at each of the plurality of vertices,
determining a vertex associated with a highest overall throughput among the plurality of vertices, and
determining CQIs for the first and second streams based on a first threshold and a second threshold corresponding to the vertex associated with the highest overall throughput.

10. The method of claim 9, wherein the determining the CQIs for the multiple streams further comprises
repeating the determining a plurality of vertices, the determining an overall throughput, and the determining a vertex associated with a highest overall throughput for each of a plurality of precoding matrices,
selecting a precoding matrix associated with a highest overall throughput among the plurality of precoding matrices, and
determining the CQIs for the first and second streams based on the first threshold and the second threshold corresponding to the vertex associated with the highest overall throughput for the selected precoding matrix.

11. The method of claim 10, wherein the determining the CQIs for the first and second streams comprises
mapping the first threshold to a first CQI for the first stream, and
mapping the second threshold to a second CQI for the second stream.

12. The method of claim 10, further comprising:
reporting the selected precoding matrix and the CQIs for the first and second streams; and
receiving a transmission of the first and second streams transmitted based on the selected precoding matrix and the CQIs.

13. An apparatus for wireless communication, comprising:
means for determining at least one parameter based on at least one constellation constrained capacity function; and
means for determining channel quantity indicators (CQIs) for multiple streams for a non-linear detector based on the at least one parameter,
wherein the multiple streams comprise a first stream and a second stream,
wherein the means for determining the at least one parameter comprises means for determining at least one first threshold for the first stream and at least one second threshold for the second stream based on the at least one constellation constrained capacity function, each first threshold corresponding to a different modulation order for the second stream, and each second threshold corresponding to a different modulation order for the first stream,
wherein the means for determining the at least one first threshold and the at least one second threshold comprises means for determining the at least one first threshold and the at least one second threshold based further on a precoding matrix and a channel matrix, and
wherein the means for determining the CQIs for the multiple streams comprises
means for evaluating each of a plurality of precoding matrices,
means for selecting a precoding matrix associated with a highest overall throughput among the plurality of precoding matrices, and
means for determining CQIs for the first and second streams based on a first threshold and a second threshold corresponding to the highest overall throughput for the selected precoding matrix.

14. The apparatus of claim 13, wherein the means for determining the at least one first threshold and the at least one second threshold comprises means for determining the at least one first threshold and the at least one second threshold based further on a noise covariance matrix.

15. An apparatus for wireless communication, comprising:
means for determining at least one parameter based on at least one constellation constrained capacity function; and
means for determining channel quantity indicators (CQIs) for multiple streams for a non-linear detector based on the at least one parameter,
wherein the multiple streams comprise a first stream and a second stream,
wherein the means for determining the at least one parameter comprises means for determining at least one first threshold for the first stream and at least one second threshold for the second stream based on the at least one constellation constrained capacity function, each first threshold corresponding to a different modulation order for the second stream, and each second threshold corresponding to a different modulation order for the first stream,
wherein the means for determining the at least one first threshold and the at least one second threshold comprises
means for determining a first constellation constrained capacity of a channel for the second stream with a particular modulation order being used for the second stream, Gaussian noise due to the first stream, and Gaussian channel noise,
means for determining a second constellation constrained capacity of the channel for the second stream with the particular modulation order being used for the second stream and Gaussian channel noise,
means for determining a first capacity of a channel for the first stream with Gaussian channel noise,
means for determining a second capacity of the channel for the first stream with discrete interference from the second stream based on the first and second constellation constrained capacities and the first capacity, and
means for determining a first threshold for the first stream with the particular modulation order being used for the second stream based on the second capacity.

16. An apparatus for wireless communication, comprising:
means for determining at least one parameter based on at least one constellation constrained capacity function; and
means for determining channel quantity indicators (CQIs) for multiple streams for a non-linear detector based on the at least one parameter,
wherein the multiple streams comprise a first stream and a second stream,
wherein the means for determining the at least one parameter comprises means for determining at least one first threshold for the first stream and at least one second threshold for the second stream based on the at least one constellation constrained capacity function, each first threshold corresponding to a different modulation order for the second stream, and each second threshold corresponding to a different modulation order for the first stream,
wherein the means for determining the CQIs for the multiple streams comprises
means for determining a plurality of vertices of a graph formed based on the at least one first threshold on a horizontal axis and the at least one second threshold on a vertical axis,
means for determining an overall throughput for the first and second streams at each of the plurality of vertices,
means for determining a vertex associated with a highest overall throughput among the plurality of vertices, and
means for determining CQIs for the first and second streams based on a first threshold and a second threshold corresponding to the vertex associated with the highest overall throughput.

17. The apparatus of claim 16, wherein the means for determining the CQIs for the multiple streams further comprises
means for repeating the determining a plurality of vertices, the determining an overall throughput, and the determining a vertex associated with a highest overall throughput for each of a plurality of precoding matrices,
means for selecting a precoding matrix associated with a highest overall throughput among the plurality of precoding matrices, and
means for determining the CQIs for the first and second streams based on the first threshold and the second threshold corresponding to the vertex associated with the highest overall throughput for the selected precoding matrix.

18. An apparatus for wireless communication, comprising:
at least one processor configured to determine at least one parameter based on at least one constellation constrained capacity function, and to determine channel quantity indicators (CQIs) for multiple streams for a non-linear detector based on the at least one parameter,
wherein the multiple streams comprise a first stream and a second stream, wherein the at least one processor is configured to determine at least one first threshold for the first stream and at least one second threshold for the second stream based on the at least one constellation constrained capacity function, each first threshold corresponding to a different modulation order for the second stream, and each second threshold corresponding to a different modulation order for the first stream, wherein the at least one processor is configured to determine the at least one first threshold and the at least one second threshold based further on a precoding matrix and a channel matrix, and wherein the at least one processor is configured to evaluate each of a plurality of precoding matrices, to select a precoding matrix associated with a highest overall throughput among the plurality of precoding matrices, and to determine CQIs for the first and second streams based on a first threshold and a second threshold corresponding to the highest overall throughput for the selected precoding matrix.

19. The apparatus of claim 18, wherein the at least one processor is configured to determine the at least one first threshold and the at least one second threshold based further on a noise covariance matrix.

20. An apparatus for wireless communication, comprising:
at least one processor configured to determine at least one parameter based on at least one constellation constrained capacity function, and to determine channel quantity indicators (CQIs) for multiple streams for a non-linear detector based on the at least one parameter, wherein the multiple streams comprise a first stream and a second stream, wherein the at least one processor is configured to determine at least one first threshold for the first stream and at least one second threshold for the second stream based on the at least one constellation constrained capacity function, each first threshold corresponding to a different modulation order for the second stream, and each second threshold corresponding to a different modulation order for the first stream, wherein the at least one processor is configured to
determine a first constellation constrained capacity of a channel for the second stream with a particular modulation order being used for the second stream, Gaussian noise due to the first stream, and Gaussian channel noise, determine a second constellation constrained capacity of the channel for the second stream with the particular modulation order being used for the second stream and Gaussian channel noise, determine a first capacity of a channel for the first stream with Gaussian channel noise, to determine a second capacity of the channel for the first stream with discrete interference from the second stream based on the first and second constellation constrained capacities and the first capacity, and determine a first threshold for the first stream with the particular modulation order being used for the second stream based on the second capacity.

21. An apparatus for wireless communication, comprising:
at least one processor configured to determine at least one parameter based on at least one constellation constrained capacity function, and to determine channel quantity indicators (CQIs) for multiple streams for a non-linear detector based on the at least one parameter, wherein the multiple streams comprise a first stream and a second stream, wherein the at least one processor is configured to determine at least one first threshold for the first stream and at least one second threshold for the second stream based on the at least one constellation constrained capacity function, each first threshold corresponding to a different modulation order for the second stream, and each second threshold corresponding to a different modulation order for the first stream, wherein the at least one processor is configured to
determine a plurality of vertices of a graph formed based on the at least one first threshold on a horizontal axis and the at least one second threshold on a vertical axis, determine an overall throughput for the first and second streams at each of the plurality of vertices, to determine a vertex associated with a highest overall throughput among the plurality of vertices, and determine CQIs for the first and second streams based on a first threshold and a second threshold corresponding to the vertex associated with the highest overall throughput.

22. The apparatus of claim 21, wherein the at least one processor is configured to
repeat determining a plurality of vertices, determining an overall throughput, and determining a vertex associated with a highest overall throughput for each of a plurality of precoding matrices, select a precoding matrix associated with a highest overall throughput among the plurality of precoding matrices, and determine the CQIs for the first and second streams based on the first threshold and the second threshold corresponding to the vertex associated with the highest overall throughput for the selected precoding matrix.

23. A computer program product, comprising:
a non-transitory computer-readable medium comprising:
code for causing at least one computer to determine at least one parameter based on at least one constellation constrained capacity function, and code for causing the at least one computer to determine channel quantity indicators (CQIs) for multiple streams for a non-linear detector based on the at least one parameter, wherein the multiple streams comprise a first stream and a second stream, wherein the determining the at least one parameter comprises determining at least one first threshold for the first stream and at least one second threshold for the second stream based on the at least one constellation constrained capacity function, each first threshold corresponding to a different modulation order for the second stream, and each second threshold corresponding to a different modulation order for the first stream, wherein the determining the at least one first threshold and the at least one second threshold comprises determining the at least one first threshold and the at least one second threshold based further on a precoding matrix and a channel matrix, and wherein the determining the CQIs for the multiple streams comprises
evaluating each of a plurality of precoding matrices,
selecting a precoding matrix associated with a highest overall throughput among the plurality of precoding matrices, and determining CQIs for the first and second streams based on a first threshold and a second threshold corresponding to the highest overall throughput for the selected precoding matrix.

24. A computer program product, comprising:
a non-transitory computer-readable medium comprising:
code for causing at least one computer to determine at least one parameter based on at least one constellation constrained capacity function, and
code for causing the at least one computer to determine channel quantity indicators (CQIs) for multiple streams for a non-linear detector based on the at least one parameter,
wherein the multiple streams comprise a first stream and a second stream,
wherein the determining the at least one parameter comprises determining at least one first threshold for the first stream and at least one second threshold for the second stream based on the at least one constellation constrained capacity function, each first threshold corresponding to a different modulation order for the second stream, and each second threshold corresponding to a different modulation order for the first stream,
wherein the determining the at least one first threshold and the at least one second threshold comprises
determining a first constellation constrained capacity of a channel for the second stream with a particular modulation order being used for the second stream, Gaussian noise due to the first stream, and Gaussian channel noise,
determining a second constellation constrained capacity of the channel for the second stream with the particular modulation order being used for the second stream and Gaussian channel noise,
determining a first capacity of a channel for the first stream with Gaussian channel noise,
determining a second capacity of the channel for the first stream with discrete interference from the second stream based on the first and second constellation constrained capacities and the first capacity, and
determining a first threshold for the first stream with the particular modulation order being used for the second stream based on the second capacity.

25. A computer program product, comprising:
a non-transitory computer-readable medium comprising:
code for causing at least one computer to determine at least one parameter based on at least one constellation constrained capacity function, and
code for causing the at least one computer to determine channel quantity indicators (CQIs) for multiple streams for a non-linear detector based on the at least one parameter,
wherein the multiple streams comprise a first stream and a second stream,
wherein the determining the at least one parameter comprises determining at least one first threshold for the first stream and at least one second threshold for the second stream based on the at least one constellation constrained capacity function, each first threshold corresponding to a different modulation order for the second stream, and each second threshold corresponding to a different modulation order for the first stream,
wherein the determining the CQIs for the multiple streams comprises
determining a plurality of vertices of a graph formed based on the at least one first threshold on a horizontal axis and the at least one second threshold on a vertical axis,
determining an overall throughput for the first and second streams at each of the plurality of vertices,
determining a vertex associated with a highest overall throughput among the plurality of vertices, and
determining CQIs for the first and second streams based on a first threshold and a second threshold corresponding to the vertex associated with the highest overall throughput.

* * * * *